(12) United States Patent
Yeh et al.

(10) Patent No.: US 8,406,684 B1
(45) Date of Patent: Mar. 26, 2013

(54) TWO-WAY RADIO DEVICE WITH COMBINED MOBILE COMMUNICATION FUNCTION

(75) Inventors: Shin-Tseng Yeh, New Taipei (TW); Yang-Hui Li, Guangzhou (CN)

(73) Assignee: Unication Group, New Taipei (TW)

( * ) Notice: Subject to any disclaimer, the term of this patent is extended or adjusted under 35 U.S.C. 154(b) by 0 days.

(21) Appl. No.: 13/427,867

(22) Filed: Mar. 22, 2012

(51) Int. Cl.
*H04H 40/00* (2008.01)
*H04H 20/71* (2008.01)
(52) U.S. Cl. ..................... 455/3.06; 455/3.05
(58) Field of Classification Search ............... 455/3.06, 455/3.05; 340/4.37, 4.4; 381/2–18, 77–85; 725/37, 64
See application file for complete search history.

(56) References Cited

U.S. PATENT DOCUMENTS 8,180,277 B2 * 5/2012 Srinivasan et al. ........... 455/3.06

\* cited by examiner

*Primary Examiner* — Charles Appiah
*Assistant Examiner* — Emem Stephen
(74) *Attorney, Agent, or Firm* — Cheng-Ju Chiang

(57) ABSTRACT

A two-way radio device with combined mobile communication function comprises at least a radio transceiver module, a 2G/3G transceiver module, a control processor, an audio processing module, a memory, a display, a button set and a power supply module. Accordingly by executing a manual operation mode or an automatic operation mode of the device, one of a radio communication function and a mobile communication function of the device is selected to be enabled so as to achieve voice and data communications with one of radio system subscribers or 2G/3G system subscribers. Besides, the device can also execute a transfer operation mode to transfer and forward communications between the radio system subscribers, or between the radio system subscribers and the 2G/3G system subscribers.

5 Claims, 4 Drawing Sheets

TWO-WAY RADIO DEVICE WITH COMBINED MOBILE COMMUNICATION FUNCTION

BACKGROUND OF THE INVENTION

1. Field of the Invention

The present invention relates to a two-way radio device (or so-called walkie-talkie), particularly refers to a device with a perfect functional combination of walkie-talkies and mobile phones. The two-way radio device is capable of using various operation modes thereof to achieve one kind of communications for radio subscribers or the second generation/third generation (2G/3G) mobile phone subscribers, or is capable of being used as a repeater between them to forward messages. The device is also even capable of communicating with phones within the Public Switched Telephone Network (PSTN) system or the Internet system through linking of 2G/3G networks.

2. The Related Arts

Currently walkie-talkies (including Analogy/Digital Radio System) on the market and mobile phones (including 2rd-generation/3rd-generation System) are two completely independent products.

General walkie-talkies are mainly used as one-on-one or one-on-many regional real-time communication devices for professionals working in public safety units, enterprises and so on (such as the police, fire department, security, medical, search-and-rescue teams, etc.). Such walkie-talkies do not rely on communication infrastructures such as 2G/3G networks (or commercial communication networks). On the other hand, users possessing walkie-talkies can communicate with each other using the same radio channel at no cost on them within radio signal coverage ranges of the walkie-talkies.

Secondly, general mobile phones (smart phones) are used to provide mobile communication services through 2G systems (Global System for Mobile Communications, GSM/Code-Division Multiple Access, CDMA) or 3G systems (Wideband Code Division Multiple Access, WCDMA/High Speed Packet Access, HSPA) or more advanced mobile network systems for 2G/3G subscribers worldwide. Therefore, such service needs to rely on huge 2G/3G network resources and infrastructures so as to achieve an enormous range of one-on-one worldwide mobile communication services. As a result, each mobile communication made by subscribers using the above mentioned networks will cost them, and mobile phones under such service cannot be used in remote areas where no repeaters (or base stations) are constructed.

For current walkie-talkies users, they usually additionally carry a mobile phone in order to facilitate their contact with 2G/3G network subscribers or PSTN subscribers, and personnel located beyond the radio coverage of their two-way radios. As a result, it becomes very inconvenient to carry both of the walkie-talkies and the mobile phone with these users.

For a mobile phone subscriber, if he is a member of one active group within a particular regional range, he may feel inconvenience to operate his mobile phone when he uses his mobile phone to communication with other group members, and he may also be limited by communication resources of his mobile phone and be charged for use of his mobile phone. On the contrary, he can use a walkie-talkie to communicate for free, and he simply needs to press the push-to-talk button (PTT) to talk. It is also convenient for him to make group talks via his walkie-talkies.

Besides, for traditional walkie-talkies user groups, if they are in need of communication with any remote walkie-talkies equipment, it generally requires the help of a repeater to forward their messages. If no the repeater is available, they will need to use mobile phones instead. However, mobile phones can only provide one-on-one communication services rather than one-on-many communication services.

In view of the above-mentioned respective advantages and disadvantages of walkie-talkies and mobile phones, inventor(s) of the present invention, based on his/her dedicated study and personal experience on research, development and manufacture of the above mentioned products for many years, finally conceives a two-way radio device with radio communication function and mobile communication functions at the same time.

SUMMARY OF THE INVENTION

The main objective of the present invention is to provide a two-way radio device with combined mobile communication function. In its radio communication function, the device supports not only analog radio (such as Continuous Tone-Coded Squelch System, CTCSS; Continuous Digital Coded Squelch System, CDCSS; 2 tone; 5/6 Tone; Motorola Data Communication, MDC/200; Universal Device Connector, UDC2400), but also digital radio (such as Digital Mobile Radio, DMR, Project 25, P25, Terrestrial Trunked Radio, Tetra) while the above-mentioned may also be referred as two-way radio networks. In its mobile communication function, the device at least supports 2G (GSM/CDMA) networks and/or 3G (WCDMA/HSPA) networks. Users of the two-way radio device can also communicate with mobile phone subscribers for proceeding voice and data communications with each other, of course, as well as Short Message Service (SMS) text message service, or data transmission.

The secondary objective of the present invention is to provide a two-way radio device with combined mobile communication function. The device further provides a relay forwarding function to make a radio device capable of proceeding voice communication with at least one remote terminal device through forwarding of the two-way radio device, and capable of proceeding one-on-many or many-on-many communications with the remote terminal devices.

To achieve the above objective, a two-way radio device with combined mobile communication function mentioned in the present invention comprises at least a radio transceiver module, a 2G/3G transceiver module, a control processor, an audio processing module, a memory, a display, a button set and a power supply module. Among them, the control processor is a core component of the two-way radio device and is used to connect and control execution of all of the above mentioned components, and further performs message transmission function through software programs. The radio transceiver module is used for execution of receiving and transmission functions of analog and/or digital radio signals. The 2G/3G transceiver module is used for execution of receiving and transmission functions of 2G/3G signals. The audio processing module is used to perform switching function of a variety of audio paths, and also is used for execution of functions of switching of analog and digital audio signals, amplification of analog audio signals, and recording and playing functions of audio signals, etc. The power supply module is used to provide power required for other components.

As the two-way radio device mentioned above, the control processor at least comprises built-in software programs for a manual operation mode and an automatic operation mode. The software programs are used to switch the two-way radio device to execute a radio communication function thereof and/or a mobile communication function thereof for communication. Among them, the manual operation mode enables manual selections from a sub-menu presented on the display through the built-in software programs of the two-way radio device so as to click to select one of the radio communication function or the mobile communication function to communicate. The automatic operation mode enables both of the radio communication function and the mobile communication function at the same time, and the two-way radio device in the automatic operation mode performs automatically radio signal detection to determine whether another corresponding side is a radio device within a radio coverage of the two-way radio device or not when a call request is send out or a call request from the another corresponding side is about to be responded. If yes, the two-way radio device enables the radio communication function to communicate. If not, the two-way radio device automatically switches to the mobile communication function to communicate. Accordingly, switching use function between radio systems and 2G/3G systems can be achieved.

Furthermore, the device of the present invention provides a built-in function of a transfer operation mode in the control processor thereof so as to be used as a repeater between a radio device and at least one remote terminal device for forwarding messages, and for allowing the radio device proceeding one-on-many or many-on-many communications.

For better and further knowledge and understanding of Examiners to the device/method of the present invention and efficacy thereof, feasible embodiments are hereby given with detailed descriptions in cooperation with drawings as follows.

DETAILED DESCRIPTION OF PREFERRED EMBODIMENT

Figure 1:
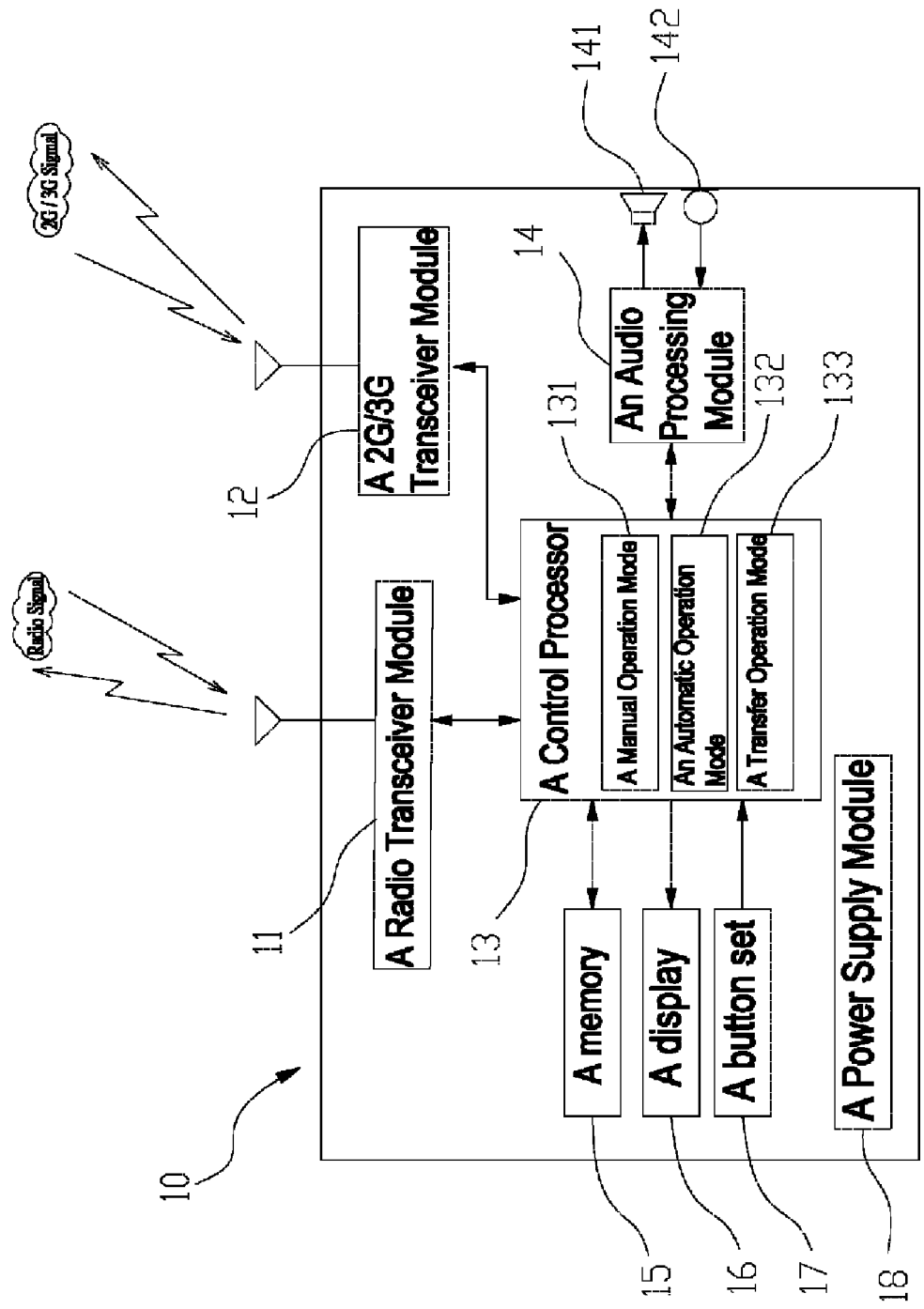
FIG. 1 shows a simple circuit block diagram of a two-way radio device of the present invention.

With reference to FIG. 1, a two-way radio device 10 with combined mobile communication function of the present invention comprises at least a radio transceiver module 11, a 2G/3G (second generation/third generation) transceiver module 12, a control processor 13, an audio processing module 14, a memory 15, a display 16 (including touch control panels), a button set 17, and a power supply module 18. Among them, the control processor 13 is a core component of the two-way radio device 10 and is used to connect and control executions and works of all of the above mentioned components, and further performs message (Short Message Service, SMS and DATA) transmission function through software programs. The radio transceiver module 11 is used for execution of receiving and transmission functions of analog and/or digital radio signals. The 2G/3G transceiver module 12 is used for execution of receiving and transmission functions of 2G/3G (Global System for Mobile Communications, GSM/General Packet Radio Services, GPRS/Enhanced Data GSM Environment, EDGE/Wideband Code Division Multiple Access, WCDMA/High Speed Packet Access, HSPA, protocols) signals. The audio processing module 14 is used to perform switching (on/off) function of a variety of audio paths (including paths between the audio processing module 14 and the radio transceiver module 11, the 2G/3G transceiver module 12 and the control processor 13), and also is used for execution of functions of switching of analog and digital audio signals, amplification of analog audio signals, and recording and playing of audio signals, etc. The power supply module 18 is used to provide power required for other components (including battery and power-chargeable functions).

As the two-way radio device 10 mentioned above, the control processor 13 at least comprises built-in software programs for a manual operation mode 131 and an automatic operation mode 132. The software programs are used to switch the two-way radio device 10 to execute a radio communication function and/or a mobile phone communication function thereof. Among them, the manual operation mode 131 enables manual selections from a sub-menu on the display 16 through the built-in software programs of the two-way radio device 10 so as to directly click to select one of the radio communication function and the mobile communication function for communication. The automatic operation mode 132 enables the radio communication function and the mobile communication function at the same time, and in this mode, the two-way radio device 10 is capable of performing automatically radio signal detection to determine whether the other corresponding side is a radio device within the radio coverage of the two-way radio device 10 or not when the user sends out a call request or responds to such requests. If yes, the device 10 enables the radio communication function thereof to communicate, and if not, the device 10 automatically switches to the 2G/3 G communication function to communicate.

For example, the user, through his/her operation on input devices such as the display 16 and/or the button set 17 and so on, input a call request command to the control processor 13. When receiving this command, the control processor 13 immediately transmits a detection (scanning) command to the radio transceiver module 11 to perform radio detection on objective devices. If the radio transceiver module 11 can detect the objective devices, the control processor 13 directly performs the radio communication function to communicate. On the contrary, the control processor 13 automatically switches to the 2G/3G transceiver module 12 for performing the mobile communication function to communicate. As a result, the purpose of execution of voice communications in one of the radio system and the 2G/3G system can be achieved.

As the two-way radio device 10 mentioned above, the control processor 13 further comprises built-in software programs to execute a transfer operation mode 133. The transfer operation mode 133 is selected by clicking from the function menu presented on the display 16, and it simultaneously enables the radio communication function and the mobile communication function to perform call transfers under the radio communication function and/or the mobile communication function. In such mode, the two-way radio device 10 is used as a repeater to forward messages between a radio device and at least one remote terminal device.

Figure 2:
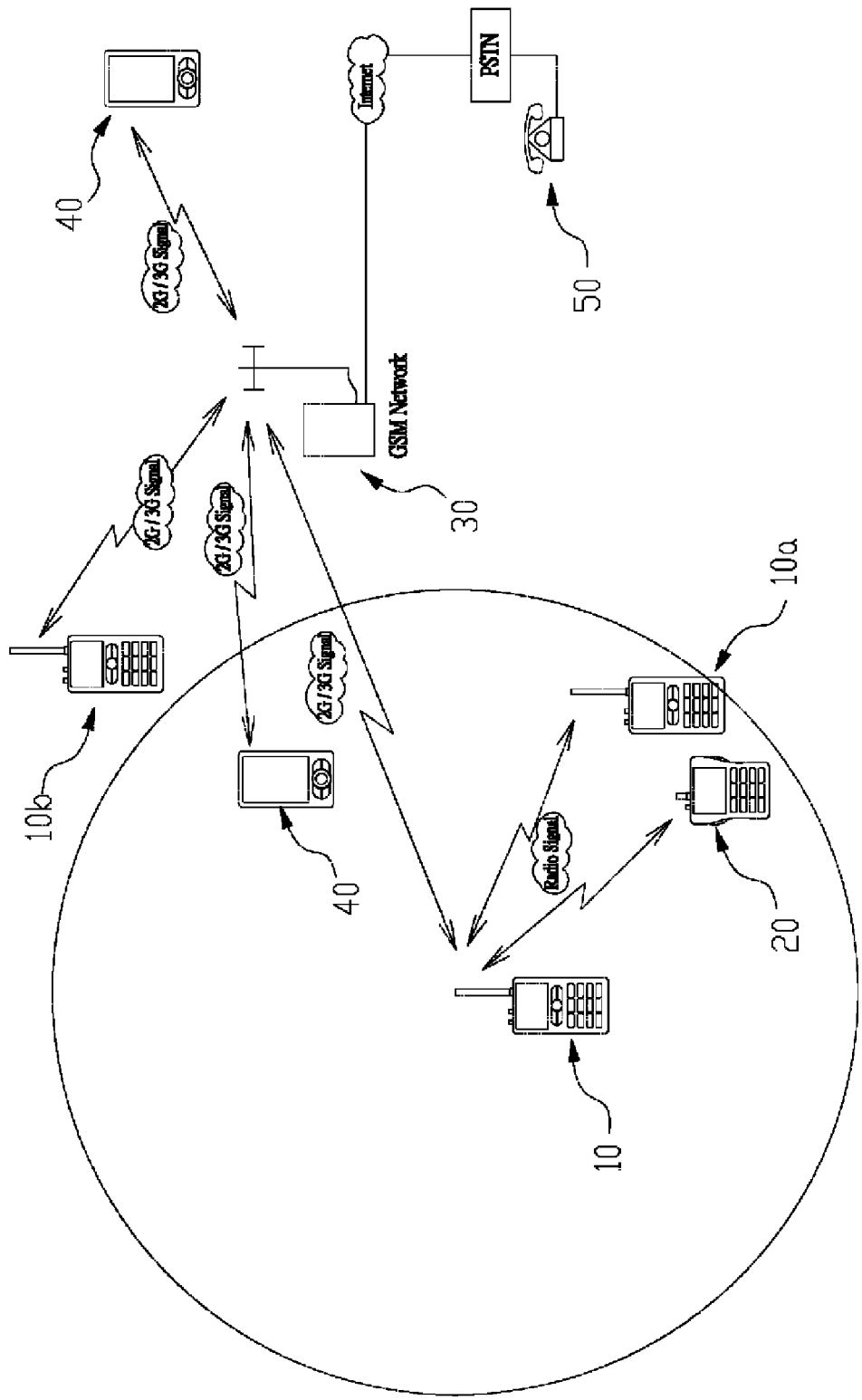
FIG. 2 shows a schematic implementing diagram of the device of the present invention in use of one of radio communication functions and mobile communication functions thereof.

As mentioned above with reference to FIGS. 1 and 2, in execution of the manual operation mode 131, if a known objective device is a traditional walkie-talkies 20 or another same two-way radio device 10a within the radio coverage of the device 10 (Referring to the big circle area in FIG. 2), it is suitable for users to select the radio communication function. At this moment, it is more convenient to communicate directly via radio signals, and it also facilitates group-talk communication. If the objective device is the two-way device 10b or mobile phones 40 outside the radio coverage of the device 10, it is suitable for users to select the mobile communication function. At this moment, through 2G/3G networks 30, users of the device 10 are able to initiate calls to or receive calls from any terminal devices (such as 10b, 40) with mobile communication functions, or to further connect with the Internet and PSTN telephones 50 by wire linking or wireless linking through the 2G/3G networks 30 to communicate and send SMS messages.

In execution of the automatic operation mode 132, the radio communication function and the mobile communication function are simultaneously enabled and the device 10 is in a standby status. When the device 10 receives a call request message, the signal detection function of the device 10 is enabled immediately to scan whether the objective device is another radio device (such as 10a or 20) within the radio coverage of the device 10 or not. The device 10 is then automatically switched to one of the radio communication function or the mobile communication function to communicate based on the detection result. Hence, it is no need to worry about missing any calls.

Figure 3:
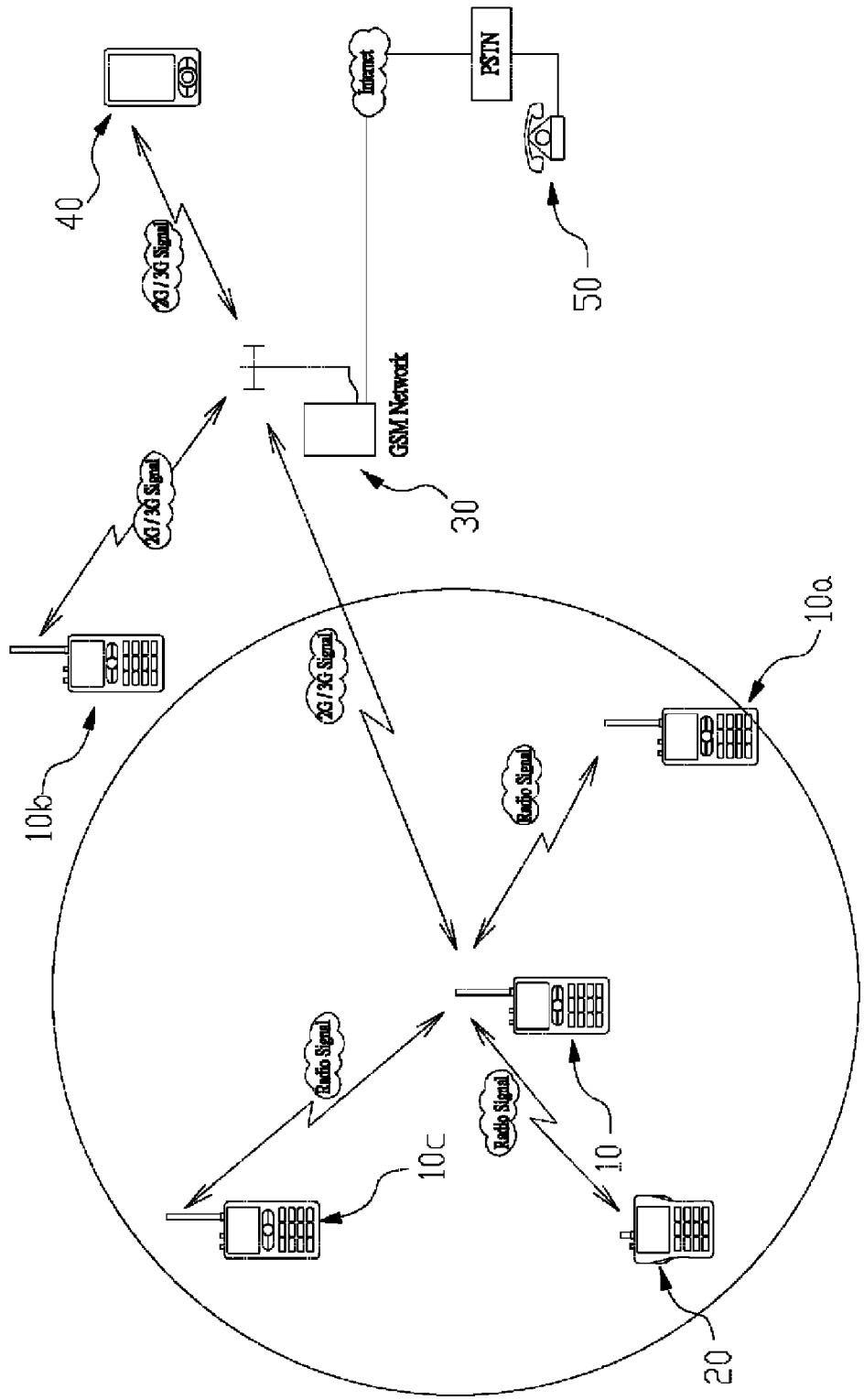
FIG. 3 shows a schematic implementing diagram of the device of the present invention in use of a repeater function thereof.

Further in execution of the transfer operation mode 133 of the present invention (Referring further to FIG. 3), the two-way radio device 10 first establishes a connection or dial-up connection to a proper remote terminal devices (including the two-way radio device 10b, the mobile phone 40 or the PSTN phone 50) through the 2G/3G networks 30, and maintain communications connection/linking. Then, after the two-way radio device 10 receives a call from the traditional walkie-talkies 20, and the two-way radio device 10 forwards the call to at least one of the linked terminal devices (10b, 40, 50) through the 2G/3G networks 30. On the contrary, the device 10 can also firstly maintain communication linking/connection with the walkie-talkies 20. After receiving a call from any of the remote terminal devices (10a, 40, 50) through the 2G/3G network 30, the device 10 further forwards the call to the walkie-talkies 20 through the radio network of the two-way radio device 10. In this way, communication between the traditional walkie-talkies 20 and any remote terminal device using non-radio systems can easily achieved.

In execution of the transfer function mentioned above, one or more than one key of the terminal device (phones using non-radio systems) is preset to be defined as "speak command" and "call end command". For example, "*#" indicates speaking, and "##" indicates call ending. In this embodiment, the mobile phone 40 is exemplified. Users can input the "*#" signal first to show speaking intention by the mobile phone 40. After receiving the "*#" signal from the mobile phone 40, the two-way radio device 10 provides voice messages such as "please wait while connecting" to inform the users of the mobile phone 40 to wait, and sends a speaking request to the walkie-talkies 20. If the radio channel of the walkie-talkies 20 is idle, a cue tone indicating "speaking" is sent to the mobile phone 40 to start communication. If the radio channel is busy, a cue tone indicating "occupied, please wait" is sent to the mobile phone 40. When the users of the mobile phone 40 are about to end the call (Offline), the users input the "##" signal and the two-way radio device 10 will release the occupied radio channel after receiving such signal. In this operation, the communication terminal of the radio system is controlled by the existing push-to-talk (PTT) key thereof.

As mentioned above, when the caller side and the receiver side of a communication both possess the two-way radio devices 10a and 10c, and the two-way radio devices 10a and 10c are not capable of establishing directly communication therebetween due to exceeding the radio coverage thereof, the two-way radio device 10 can be used as a repeater by executing the transfer operation mode 133 to forward voice messages and extend the communication range of the radio system.

Figure 4:
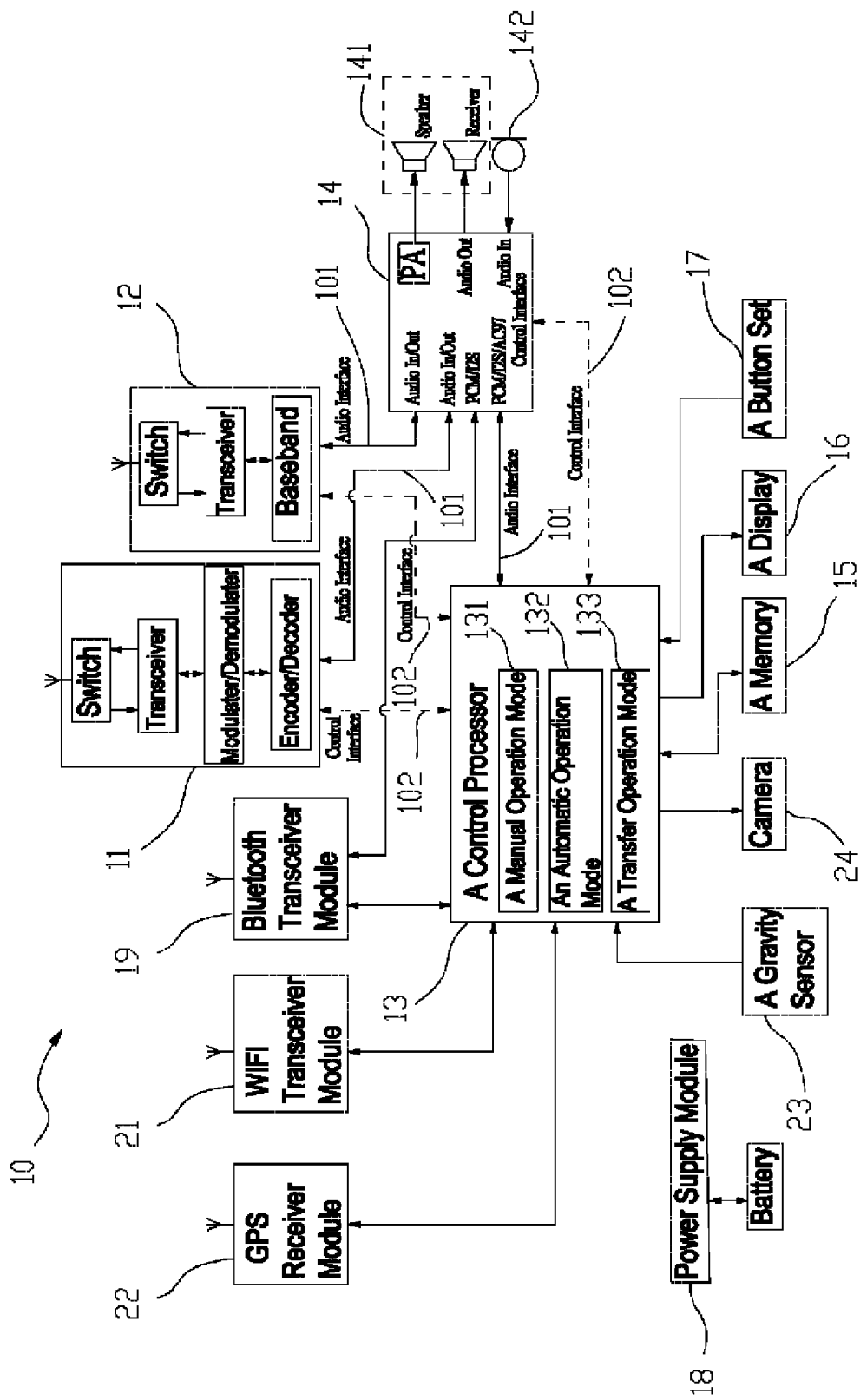
FIG. 4 shows another circuit block diagram of the two-way radio device of the present invention.

Please further refer to FIG. 4, it shows another more detailed circuit diagram of this present invention. In FIG. 4, the radio transceiver module 11 and the 2G/3G transceiver module 12 respectively comprise an audio interface 101 and a control interface 102. The audio interface 101 connects with the audio processing module 14, and the control interface 102 connects with the control processor 13. The control processor 13 sends commands and transmits digital data to the radio transceiver module 11 and the 2G/3G transceiver module 12 through the control interface 102. Between the control processor 13 and the audio processing module 14, an audio interface 101 and a control interface 102 are also connected. The control processor 13 can manage audio paths and audio parameters of the audio processing module 14 through the control interface 102. Besides, the audio processing module 14 respectively transmits/receives audio signals to/from the radio transceiver module 11, the 2G/3G transceiver module 12, and the control processor 13, etc., through the respective audio interfaces 101.

As mentioned above, when the radio communication function is selected, the control processor 13 enables the radio transceiver module 11 through the control interface 102, and controls the audio processing module 14 to activate audio paths of the radio transceiver module 11 connected with external speakers (or earphones) 141 and microphones 142 to form a voice communication circuit of the two-way radio to execute communication.

When the mobile communication (2G/3G) function is selected, the control processor 13 enables the 2G/3G transceiver module 12 through the control interface 102, and controls the audio processing module 14 to activate audio paths of the 2G/3G transceiver module 12 connected with the external speakers (or earphones) 141 and the microphones 142 to form a voice communication circuit of the mobile phone to execute communication.

When the radio communication function and the 2G/3 G communication function are selected at the same time, the control processor 13 respectively enables the radio transceiver module 11 and the 2G/3G transceiver module 12 simultaneously through the control interface 102, and controls the audio processing module 14 to activate audio paths respectively connected with the radio transceiver module 11 and the 2G/3G transceiver module 12 to simultaneously form a voice communication circuit of the two-way radio and a voice communication circuit of the mobile phone and to stay in a standby state. Then, the device 10 performs communication according to control of the automatic operation mode 132.

As the state mentioned above, if recording is necessary during proceeding of the radio communication function and/or the 2G/3 G communication function, the control processor 13 is also required to activate audio paths of the audio processing module 14 to the control processor 13. As a result, the audio processing module 14 is capable of receiving audio signals from one of the microphone 142, the radio transceiver module 11 or the 2G/3G transceiver module 12 and sending the audio signals to the control processor 13 through the audio interface 101, and then have the audio signals stored in the memory 15. On the contrary, the voice data stored in memory 15 can be retrieved out for playing or transmitting to other terminal devices.

Further with reference to FIG. 4, the two-way radio device 10 of the present invention can work by further connecting the control processor 13 with a bluetooth transceiver module 19, a wireless fidelity (WIFI) transceiver module 21, a global positioning system (GPS) receiver module 22, a gravity sensor (G-sensor) 23 and a camera 24 and other components. Further from these connective paths, respectively, voice and data information can be received and/or transmitted to enhance the using scope and function of the two-way radio device 10.

As the embodiment(s) mentioned above, it discloses only one of the feasible embodiments of the present invention. However, the illustrative embodiment is not intended to limit the scope of claims of the present invention. It is apparent to those in the art that a variety of modifications and changes may be made without departing from the scope of claims of the present invention which is intended to be defined by the appended claims.

What is claimed is:

1. A two-way radio device with combined mobile communication function, at least comprising:
   a radio transceiver module, a 2G/3G transceiver module, a control processor, an audio processing module, a memory, a display, a button set, and a power supply module;
   wherein the control processor is a core component of the two-way radio device, and is used to connect and control execution works of all other components of the two-way radio device, the control processor further performs data transmission function through software programs, the radio transceiver module is used for execution of receiving and transmission functions of analog and/or digital radio signals, the 2G/3G transceiver module is used for execution of receiving and transmission functions of 2G/3G signals, the audio processing module is used to perform switching function of a variety of audio paths, and also used for execution of functions comprising switching of analog and digital audio signals, amplification of analog audio signals, and recording and playing of audio signals, the power supply module is used to provide power required for the other components;
   wherein the control processor at least comprises built-in software programs for a manual operation mode and an automatic operation mode, the software programs are used to switch the two-way radio device to execute a radio communication function thereof and/or a mobile communication function thereof for communication;
   the manual operation mode enables manual selections from a sub-menu presented on the display through the built-in software programs of the two-way radio device so as to click to select one of the radio communication function or the mobile communication function to communicate;
   the automatic operation mode enables both of the radio communication function and the mobile communication function at the same time, and the two-way radio device in the automatic operation mode performs automatically radio signal detection to determine whether another corresponding side is a radio device within a radio coverage of the two-way radio device or not when a call request is send out or a call request from the another corresponding side is about to be responded, if yes, the two-way radio device enables the radio communication function to communicate, if not, the two-way radio device automatically switches to the mobile communication function to communicate.

2. The two-way radio device as claimed in claim 1, wherein the control processor further comprises built-in software programs to execute a transfer operation mode, the transfer operation mode is selected by clicking from a function menu presented on the display, and simultaneously enables the radio communication function and the mobile communication function to perform call transfers under the radio communication function and/or the mobile communication function, the two-way radio device in the transfer operation mode is used as a repeater for forwarding messages between a radio device and at least one remote terminal device.

3. The two-way radio device as claimed in claim 2, wherein the radio device comprises any one of traditional walkie-talkies and two-way radio devices.

4. The two-way radio device as claimed in claim 2, wherein the remote terminal device comprises any one of two-way radio devices, mobile phones and PSTN (Public Switched Telephone Network) phones.

5. The two-way radio device as claimed in claim 4, wherein one or more than one key of the mobile phones or PSTN phones of the remote terminal device is preset to define as "speak command" and "call end command".

* * * * *